United States Patent [19]
Ross

[11] 3,750,025
[45] July 31, 1973

[54] ENERGY AMPLIFYING SELECTOR GATE FOR BASE-BAND SIGNALS

[75] Inventor: Gerald F. Ross, Lexington, Mass.

[73] Assignee: Sperry Rand Corporation, Great Neck, N.Y.

[22] Filed: Apr. 26, 1971

[21] Appl. No.: 137,355

[52] U.S. Cl................ 325/321, 325/322, 325/325, 343/17.1 R
[51] Int. Cl. ........................................... H04b 1/16
[58] Field of Search .......................... 343/5 R, 17.1; 325/322, 323, 325, 129

[56] References Cited
UNITED STATES PATENTS

| | | | |
|---|---|---|---|
| 3,662,316 | 5/1972 | Robbins | 325/325 X |
| 3,659,203 | 4/1972 | Ross et al. | 325/129 X |

Primary Examiner—Benjamin A. Borchelt
Assistant Examiner—G. E. Montone
Attorney—S. C. Yeaton

[57] ABSTRACT

Energy amplifying timed selector or gating circuits for sampling base-band signals, such as directively transmitted signals reflected from objects, include a dispersionless, broad band transmission line system cooperating with a biased semi-conductor receiver-detector located in the transmission line system for instantaneously gating and detecting substantially the total energy of base-band signals and for providing corresponding time selected or gated outputs suitable for indication of the presence of such gated pulses.

11 Claims, 3 Drawing Figures

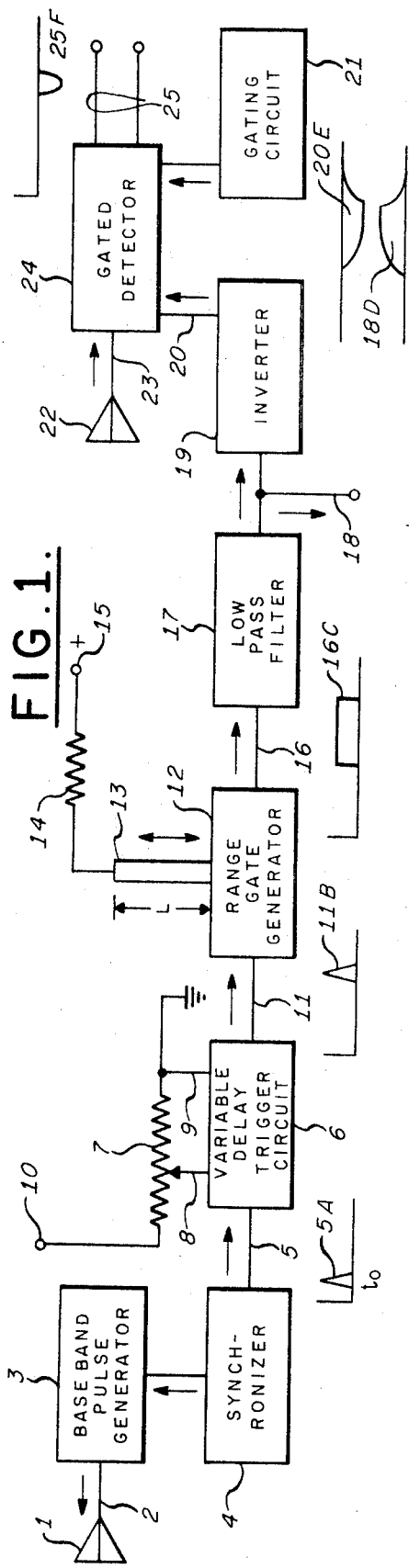
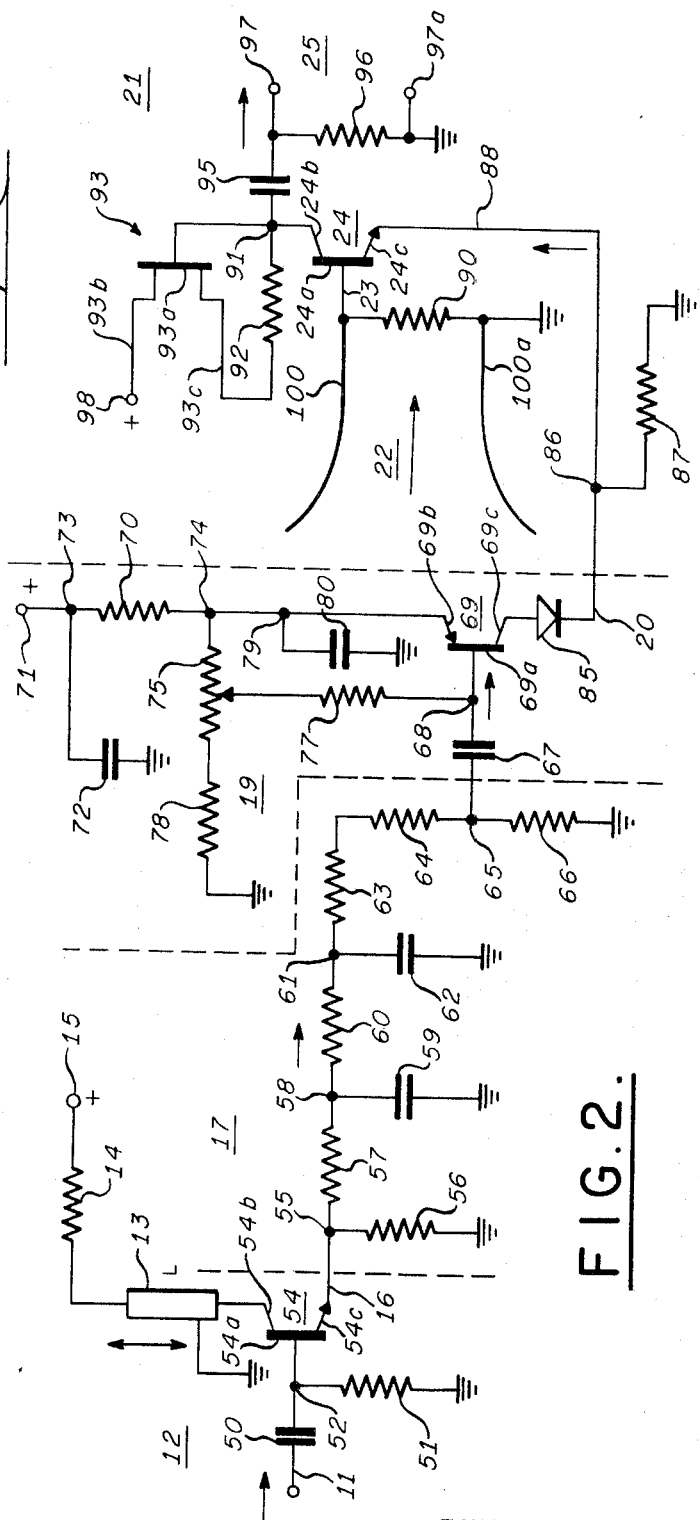

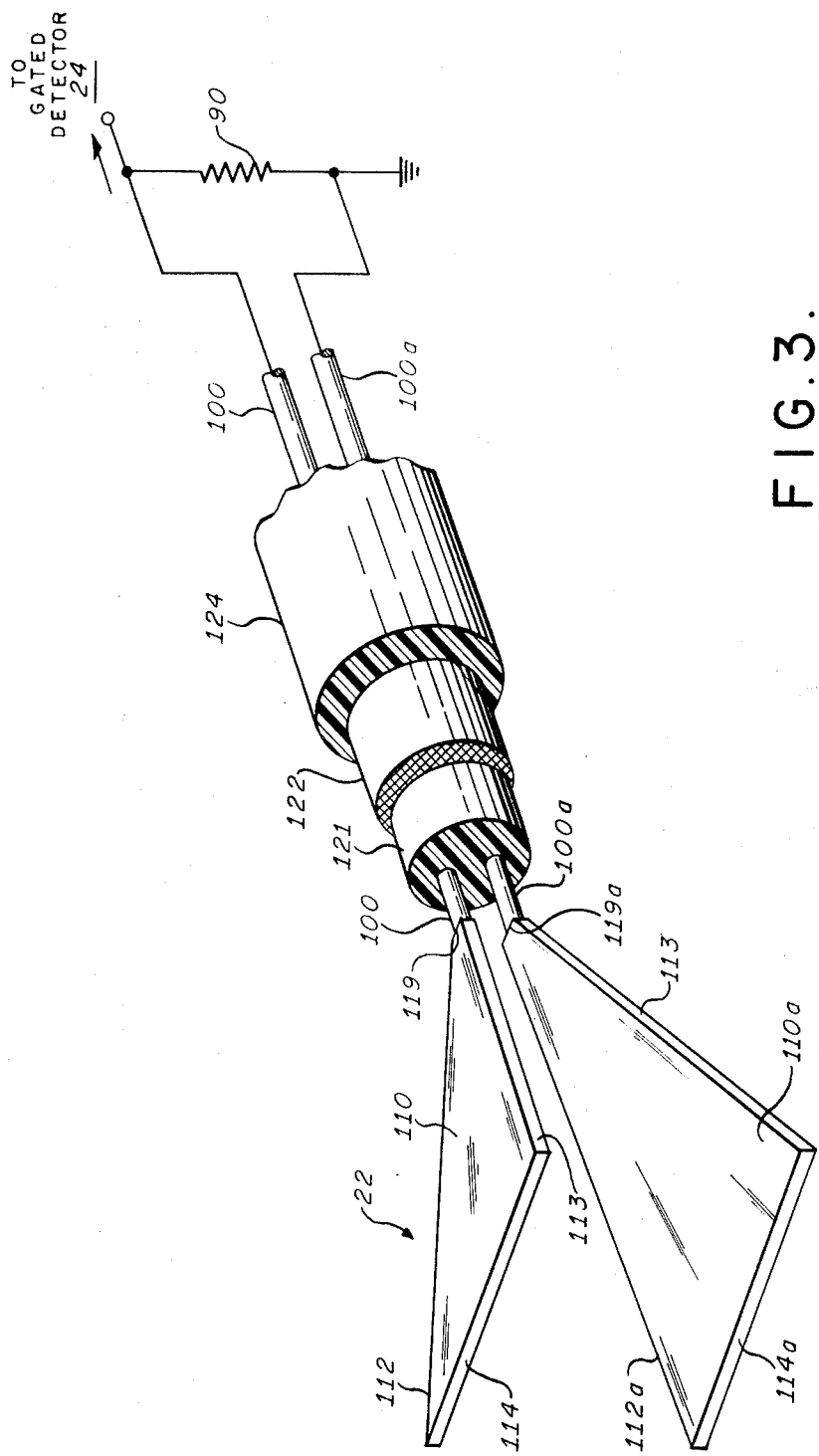

ENERGY AMPLIFYING SELECTOR GATE FOR BASE-BAND SIGNALS

BACKGROUND OF THE INVENTION

1. Field of the Invention

The invention pertains to means for the reception, selective gating, and wave form conversion of base-band or subnanosecond electromagnetic signals and more particularly pertains to means for reception and selectively utilizing such base-band signals for the generation of control signals according to the presence or to other characteristics of such base-band signals.

2. Description of the Prior Art

Generally, prior art signal selector or gating systems are associated with the gating of continuous wave intermediate or even audio frequency pulsed signals, often of many cycles duration. In prior applications, the pulse signal to be selected is often originally in the form of a pulsed high frequency carrier signal, so that complex signal reception, amplification, and frequency conversion circuits must be used to process the signal prior to the selection or gating step. Such circuits are notoriously complex and inefficient, are sensitive to many failure possibilities, and must have band widths sufficient to process pulsed signals, such as pulsed carrier signals reflected by objects illuminated by an object detector transmitter. Furthermore, such prior signal receiver and selector circuits are not adaptable for selecting or gating signals separated only by very short intervals from other similar signals, such as system synchronizer signals of the type causing transmitter operation in conventional object detector systems. For this and other reasons, conventional object detector receiver and signal gating systems are not capable of measuring ranges of close-by objects. Furthermore, prior art selector or range gating circuits are not adaptable to the direct processing of short base-band or subnanosecond signals.

SUMMARY OF THE INVENTION

The present invention relates to an electromagnetic energy pulse system for receiving and selectively gating a very short base-band electromagnetic pulse or pulses, and for supplying an energy amplified output useful for operating utilization equipment. The novel system employs a substantially dispersionless, very wide band transmission line arrangement cooperating directly with a biased semiconductor gating or selector device located in the transmission line for detecting the total energy of the in-coming base-band pulse. A cooperating circuit coupled to the gating or selector device supplies a corresponding output signal suitable for application in utilization circuits and permits the system to recycle, making it ready for the receipt of a succeeding short base-band pulse. Since the total energy of the base-band pulse is instantaneously supplied by the dispersionless transmission line system to the semiconductor gating device, the gating system may operate with short base-band pulse signals having spectral components the amplitudes of which are all incapable of detection by conventional relatively narrow band receivers.

The total energy in each base-band pulse can, however, be relatively larger than the level of noise or other interfering pulses or signals in the vicinity of the novel receiver-detector. Thus, by appropriately adjusting the sensitivity or threshold of the novel receiver-detector, base-band signals not affecting other receivers are readily received, detected, and gated without the detector being affected in substantial degree by other radio energy transmissions. The major processing of the echo signals is accomplished, according to the invention, by simple base-band signal circuits, thus avoiding the need for signal frequency conversion and the problems associated with alignment and operation of conventional radio and intermediate frequency amplifiers.

BRIEF DESCRIPTION OF THE DRAWINGS

FIG. 1 is a block diagram showing the invention embodied in an object detector system.

FIG. 2 is a detailed circuit diagram of portions of FIG. 1 showing circuit components and their electrical interconnections.

FIG. 3 is a perspective view, partly in cross section, of a receiver antenna arrangement useful with the apparatus of FIGS. 1 and 2.

DESCRIPTION OF THE PREFERRED EMBODIMENTS

FIG. 1 illustrates the novel wave amplifying selector gate in application, by way of example, in a base-band pulse object detector of the general type disclosed by G. F. Ross in the U.S. patent application Ser. No. 134,990 for a "Base-Band Pulse Object Sensor System," filed Apr. 19, 1971, and assigned to the Sperry Rand Corporation. The novel wave selector gate may, however, be equally well used in other types of object detector systems and in other base-band or short pulse duration signal transmission systems, including time domain measurement systems of the general type disclosed by G. F. Ross and A. M. Nicolson in the U.S. patent application Ser. No. 99,948, filed Dec. 21, 1970 for a system for "Time Domain Measurement of High Frequency Complex Permittivity and Permeability of Transmission Line Enclosed Material Sample," issued Sept. 19, 1972 as U.S. Pat. No. 3,693,080, and also assigned to the Sperry Rand Corporation. Accordingly, it will be seen that the novel wave amplifying selector gate of the present invention may be used in gating or selecting base-band or subnanosecond energy pulses whether or not a free space propagation path is involved.

In FIG. 1, the novel wave amplifying selector gate is employed to serve as an object range gating device wherein base-band or subnanosecond space transmissions are actually involved. For example, the base band pulse generator 3 is triggered by a pulse such as pulse 5A originating in the system synchronizer 4 at time $t_0$. A base-band signal of subnanosecond duration propagates along dispersionless TEM mode transmission line 2 and is radiated by directive antenna 1 toward a reflecting object. Reflected signals are received by the dispersionless receiver antenna 22, which also operates in the TEM mode, and are coupled by transmission line 23 to the gated receiver detector 24. When gated receiver detector 24 is in its conductive state, output signals appear on output leads 25 for supply to utilization apparatus of known type and function, such as to target presence of object range displays of the type disclosed in the aforementioned U.S. patent application Ser. No. 134,990, for example.

Synchronizer 4, base-band pulse generator 3, transmission line 2, and transmitter antenna 1 may, for instance, be elements of the integrated type of transmitter-radiator system taught by G. F. Ross and D. Lamensdorf in the U.S. patent application Ser. No. 46,079, for a "Balanced Radiation System," filed June 15, 1970, issued Apr. 25, 1972 as U.S. Pat. 3,659,203, and assigned to the Sperry Rand Corporation. The latter device employs an electrically smooth, constant impedance, transmission line system for propagating TEM mode electromagnetic waves. The transmission line system is employed for the cooperative cyclic storage of energy and for its cyclic release by propagation along the transmission line and radiation at an end of the transmission line formed as a directive antenna. Thus, cooperative use is made of the transmission line system for signal generation by charging the transmission line at a first rate of charging and also for signal radiation into space by discharging the line in a time much shorter than required for charging. Discharge of the transmission line causes a voltage wave to travel toward the radiating aperture of the antenna structure. The process operates to produce, by differentiation, a short base-band impulse of subnanosecond duration that is radiated into space toward a reflecting object. The antenna system has a wide instantaneous band width, so that it may radiate such very sharp impulse-like signals with low distortion. Further, the antenna has an energy focusing characteristic such that energy radiated in a predetermined direction is maximized, as is desirable in object detection systems.

Other types of transmitter-radiator systems may be employed. For example, there is known in the art a variety of transmitter systems for producing single positive or negative going pulses or regular or other trains of pulses, each pulse having very short duration, and for radiating such pulses from a suitable antenna 1. Rotary and other spark gap transmitters, for instance, though somewhat inefficient, readily produce short electromagnetic pulses. Delay line pulse generators are well understood in the art to be capable of adjustment such that very short electromagnetic pulses may be radiated. One device for producing such short base-band pulses is disclosed by G. F. Ross in the U.S. Pat. No. 3,402,370 for a "Pulse Generator," issued Sept. 17, 1968.

For controlling operation of the novel wave amplifier selecting gate, the synchronizer pulse 5A is coupled by line 5 to a variable delay trigger circuit 6 for the purpose of generating on output line 11 a corresponding pulse 11B. Pulse 11B may be generally similar in characteristics to pulse 5A, though delayed by an arbitrary time interval. In one range gating application, the delay value may be set or varied in magnitude between 1 and 30 nanoseconds, for example. Variable delay trigger circuit 6 may be any of several well known adjustable pulse delay circuits, including those, for instance, whose delay characteristic may be varied according to the setting of a tap 8 adjustable along potentiometer 7 relative to lead 9, an appropriate potential being supplied to the opposite end of potentiometer 7 from a voltage source (not shown) connected to terminal 10 and which may also be grounded at its opposite end.

Variable delay trigger circuit 6 serves to determine the initiation of the wave selector gate, while range gate generator 12, whose input is supplied via line 11, determines the duration of the wave selector gate. This duration is determined, as will be further explained in connection with FIG. 2 according to the length of transmission line 13, whose center conductor is adapted to supply certain necessary operating voltages via resistor 14 from terminal 15 to the active circuit elements of range gate generator 12. The range gate thus formed is the wave 16C.

Wave 16C is supplied by line 16 to low pass filter 17, whose function is to provide a moderate integration to wave 16C, removing any transients or over-shoots from the edges of wave 16C and thus preventing false operation of succeeding circuits. Wave 18D is the modified output of filter 17, which may be provided as a positive going wave to utilization apparatus (not shown) in certain applications via terminal 18. In the present application, wave 18D is passed through inverter 19 to produce on line 20 the inverted or negative going wave 20E. Wave 20E is generally similar to wave 18D, but is inverted in polarity.

The inverted wave 20E is used to operate gated receiver-detector 24 and gating circuit 21 which forms, as will be explained, the actual gating potential used to control flow of signals through the gated receiver-detector 24 from receiver antenna 22 to output leads 25 (wave 25F). Gated detector 24 is normally desensitized; when a gating signal is present at the output of inverter 19, the gated detector 24 is made sensitive to the presence of millivolt signals collected by dispersionless antenna 22 and propagated into gated detector 24 along transmission line 23. Such sensitivity produces an amplified selected or gated output wave 25F on leads 25 of the order of 3 volts. Such a signal is adequate to operate conventional display apparatus, such as a warning or presence indicator of conventional type or such utilization apparatus as is described in the abovementioned U.S. patent application Ser. No. 134,990.

In FIG. 2, circuit details of the invention are further illustrated, with elements which appear also in FIG. 1 bearing the same reference numerals as used in FIG. 1, including range gate generator 12, low pass filter 17, inverter 19, gating circuit 21, gated detector 24, and receiver antenna 22.

The output line 11 of variable delay trigger circuit 6 supplies wave 11B via a coupling capacitor 50 and junction 52 to the base 54a of transistor 54, which transistor may be of the 2N5130 type. Junction 52, and therefore base 54a, are coupled to ground through resistor 51. The collector 54b of transistor 54 is coupled via the inner conductor of coaxial transmission line 13 of length L through resistor 14 to a source (not shown) of positive potential connected between terminal 15 and ground. The length L of open-circuited delay line 13 is adjusted according to the desired duration of the sampling or gate wave 20E. The emitter 54c of transistor 54 provides an output connection via lead 16 to low pass filter 17. In a representative circuit, resistor 14 has the value of 47 K ohms, while the voltage on terminal 15 may be from +200 to +300 volts. Other avalanche transistor delay-line pulse generators of known type may be employed as the gate generator 12.

The emitter 54c is coupled to junction 55 to provide an input to low pass filter 17, which filter is of generally conventional nature and whose components include in series relation junction 55, resistor 57, junction 58, resistor 60, junction 61, resistor 63, resistor 64, junction 65, resistor 66, and a ground connection. Junction 55 is coupled to ground via resistor 56 and the respective junctions 58 and 61 are coupled to ground through low pass filter capacitors 59 and 62. Junction 65 serves as an output terminal for the filter.

Junction 65 is coupled through the small coupling capacitor 67 to junction 68 of the inverter circuit 19 and thence to the base 69a of transistor 69, which may be of the 2N4258 kind. The emitter 69b of transistor 69 is coupled through a series circuit including junctions 79 and 74, resistor 70, and junction 73, to a source (not shown) of positive potential applied at terminal 71 and connected to ground at its opposite end. Junctions 73 and 79 are respectively coupled to ground via capacitors 72 and 80, while junction 74 is connected through potentiometer 75 and resistor 78 to ground. Capacitors 72 and 80 serve as radio frequency by-pass and decoupling components in the conventional manner. The tap 76 of potentiometer 75 is connected through resistor 77 to junction 68. The collector 69c of transistor 69 is connected as an output of the inverter 19 through diode 85. The resistance network associated with potentiometer 75 serves to adjust the potential across resistor 87 which determines the steady state hold off bias on the detector.

Diode 85 is connected by line 20 to junction 86 through resistor 87 to ground and via line 88 to the emitter 24c of gated detector transistor 24, which may be of the 2N5130 type. The collector 24b of transistor 24 is connected through junction 91 to the gate electrode 93a of field effect transistor 93, which latter may be of the 2N4274 type. The drain electrode 93b of transistor 93 is connected to a source (not shown) of positive potential applied at terminal 98 which may be of the order of +75 to +100 volts with respect to its grounded terminal. The source electrode 93c of transistor 93 is coupled via resistor 92 to junction 91 and via coupling condenser 95 to the output 25 consisting of output leads 97 and 97a connected across load resistor 96.

Base-band or subnanosecond signals to be gated are applied by line 23 to the base 24a of detector transistor 24. Such base band signals may be found across a matching load resistor 90 attached across a conventional non-dispersive TEM mode transmission line, such as a continuous two-wire line comprising constant impedance or uniformly spaced parallel conductors taking the place of the illustrated conductors 100, 100a.

The receiver antenna 22 and its associated transmission line system may take the form shown in FIG. 3, where antenna 22 comprises a structure having mirror image symmetry about a median plane at right angles to the direction of the vector of the electric field propagating into the antenna. The same type of symmetry presides in the cooperating transmission line 23 which comprises parallel wire transmission line conductors 100 and 100a; conductors 100 and 100a are spaced wire conductors constructed of a material capable of conducting high frequency currents with substantially no ohmic loss. Furthermore, conductors 100 and 100a are so constructed and arranged as to support TEM mode propagation of high frequency energy, with the major portion of the electric field lying between conductors 100 and 100a.

The TEM receiver antenna 22 further consists of a pair of flared, flat, electrically conducting planar members 110 and 110a. Members 110 and 110a are, for example, generally triangular in shape, member 110 being bounded by flared edges 112 and 113 and a frontal aperture edge 114. Similarly, member 110a is bounded by flaring edges 112a and 113a and a frontal aperture edge 114a. Frontal aperture edges 114 and 114a may be straight or arcuate. Each of triangular members 110 and 110a is slightly truncated at its apex, the truncations 119 and 119a being so constructed and arranged that conductor 100 is smoothly joined without overlap at truncation 119 to antenna member 110. Likewise, conductor 100a is smoothly joined without overlap at truncation 119a to antenna member 110a. It is to be understood that the respective junctions at truncations 119 and 119a are formed using available techniques for minimizing impedance discontinuities corresponding to the junctions.

It is also to be understood that the flared members 110 and 110a of antenna 22 are constructed of material highly conductive for high frequency currents. It is further apparent that the interior volume of antenna 22 may be filled with an air foamed dielectric material exhibiting low dielectric loss in the presence of high frequency fields, such material acting to support conductor 110 in fixed relation to conductor 110a. Alternatively, the conductive elements of antenna 22 may be fixed in space relation by dielectric spacers (not shown) which cooperate in forming enclosing walls for the configuration, thereby protecting the interior conducting surfaces of antenna 22 from the effects of precipitation and corrosion.

The planar collector elements 110 and 110a of receiver antenna 22 are coupled in impedance matched relation to the two wire transmission line 23. Transmission line 23 is arranged to have the same impedance as the transmission line comprising antenna elements 110 and 110a. Transmission line 23 may have its parallel wire conductors 100 and 100a molded into a dielectric enclosing element 121 for the purpose of accurately determining the separation of conductors 100 and 100a so that transmission line 23 has a constant impedance along its length. Dielectric element 121 may be surrounded, in turn, by a braided or other conductive shield 122 which may be grounded at any convenient location. Shield 122 may, in turn, be surrounded by a protective plastic cover element 124 of the well known type. Transmission line 23 is thus readily coupled to the base of field effect transistor 93, as seen in FIG. 2. Generally, the length of transmission line 23 between antenna 22 and active element 93 will be short. For example, if the rise time of the propagating signal is $\tau$ seconds, then the length D in question should be in the order of $10 D/c = \tau$, where $c$ is the propagation velocity.

A cooperating antenna 22 and transmission line 23 system of the form shown in FIGS. 2 and 3 is a preferred antenna system, in part, because desired TEM mode propagation therein is readily established. The TEM propagation mode is preferred, since it is the substantially non-dispersive propagation mode and its use therefore minimizes distortion of the propagating subnanosecond pulse signal to be received by antenna 22. The simple dual conductor transmission line structure also permits construction of the antenna-transmission line configuration with minimum impedance discontinuities. The characteristic impedance of antenna 22 is constant along its length and may thus be readily made equal to that of transmission line 23. By maintaining a continuously constant characteristic impedance and TEM propagation along the structure including antenna 22 and line 23, frequency sensitive reflections are prevented therein and frequency dispersion is eliminated. A received subnanosecond impulse therefore flows through antenna 22 into transmission line 23 without substantial reflection and without substantial degradation of its shape or amplitude. Since the full energy or amplitude of a low-level subnanosecond baseband pulse is thus delivered to the receiver detector 24 by the antenna-transmission line system, it is seen that the receiver detector 24 can be sensitive to extremely short low-level base-band pulses having an extremely wide spectral content, any component of which would be incapable of detection using conventional wide pulse reception techniques.

With reference again to FIG. 2, operation of the novel wave amplifying selector or gate circuit will be understood from the foregoing. It is seen that range gate generator 12 relies for its operation upon characteristics inherent in the 2N5130 avalanche transistor 54 and in the open circuited delay line 13 of length L. In response to the positive triggering signal 11B, transistor 54 breaks into conduction and a voltage step wave is propagated into delay line 13. When this step wave reaches the open end of line 13, it is inverted there upon reflection and returns to collector 54b, whereupon the current flow in transistor 54 is brought to zero and the transistor reverts to its nonconducting condition. Thus, the voltage wave 16C across filter resistor 56 is a sharply rising and terminating positive pulse of duration $2L/c$ seconds, a duration dictated by delay line 13 ($c$ is the velocity of propagation of the step wave in delay line 13).

In the quiescent state of the circuit of FIG. 2, transistor 69 in inverter circuit 19 is normally fully conducting, causing a current of about 30 milliamperes to flow through the emitter resistor 87 associated with detector transistor 24 (resistor 87 may have a resistance value of about 100 ohms). The voltage consequently appearing across resistor 87 will be about +3 volts and assures that detector transistor 24 is in its nonconducting state. The field effect transistor 93 acts as a constant current source, assuring that a constant current is fed via the collector 24b and emitter 24c of detector transistor 24 in its quiescent or nonconducting state so that its bias state is precisely controlled. Resistor 92 in the collector circuit of detector transistor 24 has a positive thermal coefficient and serves to afford temperature compensation for the thermal characteristic of the conduction threshold of detector transistor 24.

When wave 11B triggers range gate generator 12, the positive output wave 16C produced by range gate generator 12 is, as previously explained, fed through low pass filter 17 to inverter 19. In traversing filter 17, wave 16C is acted upon so that the positive wave 18D results, having rounded rise and fall portions. Accordingly, any high level transient near the start and the end of wave 16C are removed, a desirable result since they might otherwise undesirably trigger detector transistor 24 into conduction.

The positive wave 18D, when coupled by capacitor 67 to inverter circuit 19 and thus to the base 69a of transistor 69, causes current conduction through transistor 69 to stop, forcing the voltage across resistor 87 rapidly to fall to zero. This event places detector transistor 24 in its fully sensitive state with respect to any signal to be sampled that is collected by antenna 22, for example, and thereby arriving on line 23 at the base 24a of transistor 24. Any signal sampled by detector transistor 24 appears as a negative amplified and time extended wave 25F on the collector 24b of detector transistor 24 and is supplied by coupling condenser 95 across load resistor 96, for example. It may be then supplied to the aforementioned utilization apparatus via terminals 97 and 97a in the customary manner, since wave 25F is amplified and time extended with respect to the received short pulse or echo signal. Upon termination of the gating pulse 18D, the circuit returns to its above described quiescent state, awaiting receipt of the next succeeding triggering wave 11B.

It will be noted that transmission of short duration pulses from their source, such as from base-band pulse generator 3 of FIG. 1, is through a transmission line system or other medium that preferably operates substantially solely in the TEM mode, and that propagation modes that permit dispersion of pulses such as subnanosecond or base-band pulses are not used. Thus, the full energy of received echo and other base-band pulses originally generated by transmitter 3 is effectively directed to processing within the amplifying gated detector 24.

It is seen that the invention provides means having gain for the precise short-duration sampling of electromagnetic waves wherein the sampling time and sampling duration depend upon reliably stable elements, and that the sampling system employs stable, balanced, non-dispersive transmission line elements for preventing distortion of the signals to be sampled. The invention is capable of operation at fast sampling rates, permitting very short samples of the order of one nanosecond to be taken of signals to be sampled.

While the invention has been described in its preferred embodiments, it is to be understood that the words which have been used are words of description rather than of limitation and that changes within the purview of the appended claims may be made without departing from the true scope and spirit of the invention in its broader aspects.

I claim:
1. Base-band signal selector means comprising:
wide band transmission line means for propagating electromagnetic pulse signals in the TEM transmission mode substantially without distortion thereof,
transistor means having base, collector, and emitter means,
first circuit means responsive to said transmission line means for supplying said pulse signal to said base means substantially without distortion thereof,
second circuit means connected to said collector means for biasing said transistor means near conduction,
third circuit means connected to said emitter means for applying a selective gating signal for causing said transistor means to conduct in the presence of said selectively gated pulse signal, and
output means connected to said collector means for supplying a time extended output pulse corresponding to said selectively gated pulse signal in the presence of said selective gating signal.
2. Base-band signal selector means comprising:
wide band transmission line means for propagating electromagnetic pulse signals in the TEM transmission mode substantially without distortion thereof,
transistor means having base, collector, and emitter means, first circuit means responsive to said transmission line means for supplying said pulse signal to said base means substantially without distortion thereof, second circuit means connected to said collector means for biasing said transistor means near conduction, said second circuit means including:

field effect transistor means having source, drain, and gate electrode means, first impedance means, and first voltage source means, said first voltage source means being connected to said drain electrode means, said source electrode means being connected through said first impedance means to said collector means, and said gate electrode means being connected to said collector means, third circuit means connected to said emitter means for applying a gating signal for causing said transistor means to conduct in the presence of said pulse signal, and output means connected to said collector means for supplying a time extended output pulse corresponding to said pulse signal in the presence of said gating signal.

3. Apparatus as described in claim 2 further including second impedance means connected between said emitter means and said first voltage source means.

4. Apparatus as described in claim 3 wherein said third circuit means comprises:

synchronizer means for providing timing pulses, and means for generating said gating signal in response to said synchronizer timing pulses.

5. Apparatus as described in claim 4 wherein said means for generating said gating signal comprises:

timing pulse delay means, and circuit means responsive to said pulse delay means for forming gating pulses of longer duration than said timing pulses.

6. Apparatus as described in claim 5 wherein said circuit means for forming gating pulses includes filter means for removing undesired transients from said gating pulses.

7. Apparatus as described in claim 6 wherein said circuit for forming gating pulses includes signal inverter means for inverting said gating pulses.

8. Apparatus as described in claim 4 wherein said wide band transmission line means comprises dual conductor transmission line means having a substantially constant characteristic impedance and a substantially dispersionless characteristic.

9. Apparatus as described in claim 8 wherein said dual conductor transmission line means comprises antenna means having first and second planar conductor means with opposed major conducting surface means.

10. Apparatus as described in claim 8 wherein said transistor means is coupled in energy exchanging relation across said dual conductor transmission line means.

11. Apparatus as described in claim 4 comprising base-band transmitter means responsive to said timing pulses for providing said pulse signals.

* * * * *